United States Patent
Funazukuri et al.

(10) Patent No.: US 10,861,445 B2
(45) Date of Patent: Dec. 8, 2020

(54) INTERACTIVE APPARATUS, INTERACTIVE METHOD, AND INTERACTIVE PROGRAM

(71) Applicant: TOYOTA JIDOSHA KABUSHIKI KAISHA, Toyota (JP)

(72) Inventors: Mina Funazukuri, Toyota (JP); Shintaro Yoshizawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 15/941,056

(22) Filed: Mar. 30, 2018

(65) Prior Publication Data
US 2018/0315419 A1  Nov. 1, 2018

(30) Foreign Application Priority Data
Apr. 27, 2017  (JP) ................. 2017-088660

(51) Int. Cl.
*G10L 15/18* (2013.01)
*G10L 15/19* (2013.01)
(Continued)

(52) U.S. Cl.
CPC .... *G10L 15/1815* (2013.01); *G06F 16/90332* (2019.01); *G06F 40/268* (2020.01); *G06F 40/30* (2020.01); *G06F 40/56* (2020.01); *G10L 15/19* (2013.01); *G10L 15/22* (2013.01); *G10L 2015/223* (2013.01)

(58) Field of Classification Search
CPC ....... G06F 17/2705; G06F 17/27; G10L 15/22
See application file for complete search history.

(56) References Cited

U.S. PATENT DOCUMENTS

2007/0162280 A1\* 7/2007 Khosla ................. G10L 15/22
704/251
2011/0010177 A1\* 1/2011 Nakano ................ G10L 15/18
704/257
(Continued)

FOREIGN PATENT DOCUMENTS

| JP | 2015-099289 A | 5/2015 |
| JP | 2015-219583 A | 12/2015 |
| JP | 2016-110185 A | 6/2016 |

OTHER PUBLICATIONS

Ruiji Fu, et al., "Learning Semantic Hierarchies: A Continuous Vector Space Approach", IEEE/ACM Transactions on Audio, Speech and Language Processing, Mar. 2015, pp. 461-471, vol. 23, No. 3.

*Primary Examiner* — Samuel G Neway
(74) *Attorney, Agent, or Firm* — Sughrue Mion, PLLC (57) ABSTRACT

An interactive apparatus includes: acquisition means for acquiring profile information in which a topic in a user's speech and the number of predetermined parts of speech of words included in the speech are associated with each other; topic selection means for setting the probability that the topic is selected in such a way that topics whose numbers of predetermined parts of speech are larger are selected with a higher probability from among topics set in the profile information based on the profile information acquired by the acquisition means, and selecting the topic in accordance with the probability of the selection that has been set; and response generation means for generating a response to the user based on the topic that has been selected by the topic selection means.

9 Claims, 4 Drawing Sheets

(51) Int. Cl.
  *G06F 16/9032*  (2019.01)
  *G06F 40/30*  (2020.01)
  *G06F 40/56*  (2020.01)
  *G06F 40/268*  (2020.01)
  *G10L 15/22*  (2006.01)

(56) References Cited

U.S. PATENT DOCUMENTS

2014/0080110 A1\* 3/2014 Nguyen ................... G09B 7/00
                                                             434/362
2016/0154898 A1   6/2016 Sugiyama
2017/0213469 A1\* 7/2017 Elchik ...................... G09B 5/02
2018/0315419 A1\* 11/2018 Funazukuri ......... G10L 15/1815

\* cited by examiner

Fig. 1

PROFILE INFORMATION

| TOPIC | NUMBER OF NOUNS | NUMBER OF ADJECTIVES |
|---|---|---|
| WEATHER | 2 | 1 |
| HEALTH | 0 | 0 |
| COOKING | 0 | 0 |

Fig. 2

| TOPIC | NUMBER OF NOUNS | NUMBER OF ADJECTIVES |
|---|---|---|
| COOKING | 3 | 3 |
| HEALTH | 1 | 2 |
| WEATHER | 2 | 1 |

INTERACTIVE APPARATUS, INTERACTIVE METHOD, AND INTERACTIVE PROGRAM

CROSS REFERENCE TO RELATED APPLICATIONS

This application is based upon and claims the benefit of priority from Japanese patent application No. 2017-088660, filed on Apr. 27, 2017, the disclosure of which is incorporated herein in its entirety by reference.

BACKGROUND

The present invention relates to an interactive apparatus that conducts a dialogue with a user, an interactive method, and an interactive program.

An apparatus configured to extract words that frequently appear from speeches made by a user for a predetermined period of time as important words (see Japanese Unexamined Patent Application Publication No. 2015-099289). A case in which, for example, a robot or the like gives a speech using the important words extracted by this apparatus is assumed.

Incidentally, extraction of important words may be biased depending on the way a user talks (for example, the content of what demented patients or elderly persons talk about and the number of speeches made by these persons vary from day to day). Therefore, it is possible that the topics of the speech given by the interactive apparatus may be biased and that only the topics which the user cannot easily talk about may be provided.

SUMMARY

The present invention has been made in order to solve the aforementioned problem and aims to provide an interactive apparatus, an interactive method, and an interactive program capable of actively providing a topic about which the user can easily talk.

An aspect of the present invention to attain the aforementioned object is an interactive apparatus including: acquisition means for acquiring profile information in which a topic in a user's speech and the respective numbers of predetermined parts of speech of words included in the speech are associated with each other; topic selection means for setting the probability that the topic is selected in such a way that topics whose respective numbers of predetermined parts of speech are larger than those of the other topics set in the profile information are selected from among the other topics with a higher probability than that of each of the other topics based on the profile information acquired by the acquisition means, and selecting the topic in accordance with the probability of the selection that has been set; and response generation means for generating a response to the user based on the topic that has been selected by the topic selection means.

In this aspect, the respective predetermined parts of speech may include at least one of a noun, an adjective, an adverb, and a verb.

In this aspect, the respective predetermined parts of speech may be a combination of two or more parts of speech, and the topic selection means may select topics whose respective numbers of parts of speech and respective numbers of types of parts of speech are larger than those of the other topics with a higher probability than that of each of the other topics.

In this aspect, the predetermined parts of speech may be a noun and an adjective.

In this aspect, the topic selection means may set the probability that the topic is selected in such a way that the topic whose number of nouns and number of adjectives are the largest among topics set in the profile information is selected from among the other topics with a higher degree of probability than that of each of the other topics based on the profile information acquired by the acquisition means, and selects the topic in accordance with the probability of the selection that has been set.

In this aspect, the topic selection means may calculate the respective numbers of parts of speech obtained by subtracting the number of pronouns included in the speech from the number of predetermined parts of speech, set the probability that the topic is selected in such a way that topics whose respective numbers of parts of speech that have been calculated are larger than those of other topics set in the profile information are selected from among the other topics with a higher probability than that of each of the other topics based on the profile information acquired by the acquisition means, and select the topic in accordance with the probability of the selection that has been set.

In this aspect, the interactive apparatus may further include storage means for storing the profile information acquired by the acquisition means, in which the topic selection means may select the topic at random until a number of the user's speeches accumulated is a predetermined number or more in the profile information stored in the storage means.

One aspect of the present invention to attain the aforementioned object may be an interactive method including the steps of: acquiring profile information in which a topic in a user's speech and the number of predetermined parts of speech of words included in the speech are associated with each other; setting the probability that the topic is selected in such a way that topics whose numbers of predetermined parts of speech are larger are selected with a higher probability from among topics set in the profile information based on the profile information that has been acquired, and selecting the topic in accordance with the probability of the selection that has been set; and generating a response to the user based on the topic that has been selected.

One aspect of the present invention to attain the aforementioned object may be an interactive program causing a computer to execute the following processing of: acquiring profile information in which a topic in a user's speech and the number of predetermined parts of speech of words included in the speech are associated with each other; setting the probability that the topic is selected in such a way that topics whose numbers of predetermined parts of speech are larger are selected with a higher probability from among topics set in the profile information based on the profile information that has been acquired, and selecting the topic in accordance with the probability of the selection that has been set; and generating a response to the user based on the topic that has been selected.

According to the present invention, it is possible to provide an interactive apparatus, an interactive method, and an interactive program capable of actively providing a topic about which the user can easily talk.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

With reference to the drawings, an embodiment of the present invention will be explained below.

Figure 1:
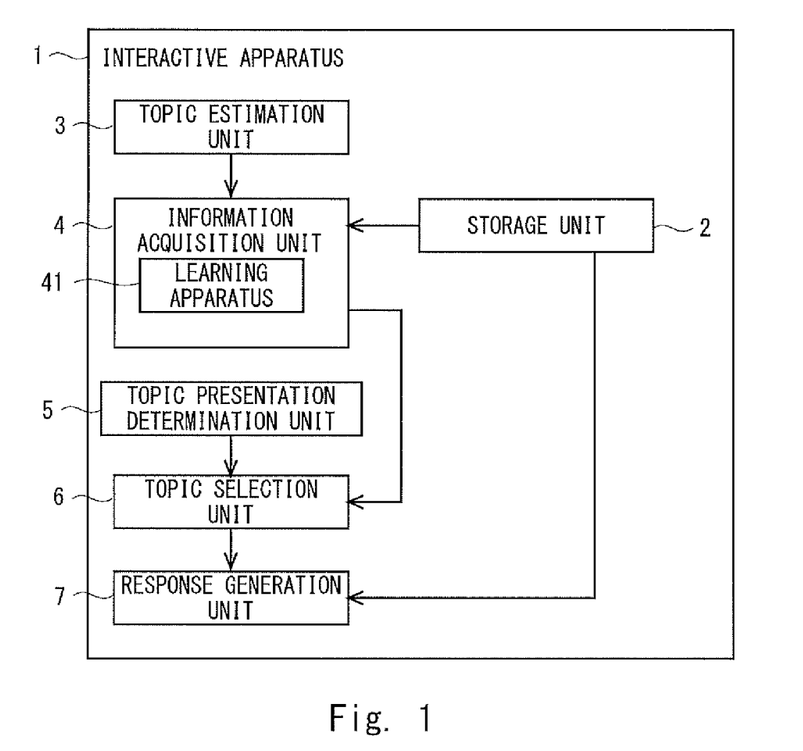
FIG. 1 is a block diagram showing a schematic system configuration of an interactive apparatus according to one embodiment of the present invention.

FIG. 1 is a block diagram showing a schematic system configuration of an interactive apparatus according to one embodiment of the present invention. An interactive apparatus 1 according to this embodiment includes, for example, a storage unit 2, a topic estimation unit 3 configured to estimate a topic, an information acquisition unit 4 configured to acquire profile information on a user, a topic presentation determination unit 5 configured to determine whether to present a topic, a topic selection unit 6 configured to select a topic, and a response generation unit 7 configured to generate a response. The interactive apparatus 1 according to this embodiment provides a topic about which the user can easily talk for the user and conducts a dialogue with the user.

The interactive apparatus 1 is formed of a hardware configuration and mainly includes a microcomputer including, for example, a Central Processing Unit (CPU) that performs operation processing and the like, a memory composed of a Read Only Memory (ROM) and a Random Access Memory (RAM) that stores an operation program or the like executed by the CPU, an interface unit (I/F) that receives or outputs signals from or to external apparatuses and the like. The CPU, the memory, and the interface unit are connected to one another via a data bus or the like.

The storage unit 2 is formed of, for example, the aforementioned memory or the like.

The topic estimation unit 3 estimates the current topic based on the user's speech history or the like stored in the storage unit 2 or the like. Accordingly, the interactive apparatus 1 is able to respond in accordance with the estimated topic. Further, it is possible to analyze the characteristics of the content of the user's speech for each topic that has been estimated.

The topic estimation unit 3 converts, for example, the words included in the speech into semantic representation vectors using a word embedding method, and learns the hierarchical relation (projection matrix) between words and topics in advance, to thereby estimate the topic from an arbitrary word.

The details of the above method is disclosed in Non-Patent Literature: Ruiji Fu, Jiang Guo, Bing Qin, Wanxiang Che, Haifeng Wang, Ting Liu, "Learning Semantic Hierarchies: A Continuous Vector Space Approach", IEEE/ACM Transactions on Audio, Speech, and Language Processing, Vol. 23, No. 3, March, 2015, p. 461-471, which can be incorporated herein by reference.

The topic estimation unit 3 may narrow down the topics from the topics that have been defined in advance based on attribute information (age, sex, hobby, etc.) and the like on the user who makes a speech and estimate the current topic from the narrowed down topics. When, for example, the user is an elderly person, this user tends to prefer topics such as health, family, and television rather than the topic such as travel. On the other hand, when the user is a man in his thirties, this user relatively tends to prefer topics such as meals, media, and family. As described above, since the tendency of the topic varies depending on the attribute information on the user, the topics of the speech are narrowed down in advance in accordance with the attribute information on the user. It is therefore possible to estimate the topic with a high accuracy in accordance with the attribute information on the user who makes a speech, whereby it is possible to continue the dialogue more effectively, as will be described later. Note that the method of estimating the topic described above is merely an example, and any desired estimation method other than the above method may be applied.

The information acquisition unit 4 is one specific example of acquisition means. The information acquisition unit 4 includes, for example, a learning apparatus 41 that learns the correspondence between the topic and the number of predetermined parts of speech of the words that appear in the user's speech that has been used to estimate the topic by the topic estimation unit 3. By learning the user's previous speeches using the learning apparatus 41 and using the result of this learning, it becomes possible to estimate the user's preference for each topic.

The predetermined parts of speech include, for example, at least one of a noun, an adjective, an adverb, and a verb. The predetermined parts of speech are set in advance in the learning apparatus 41, the storage unit 2 or the like, and may be changed as appropriate via an input apparatus such as a terminal apparatus.

The learning apparatus 41 of the information acquisition unit 4 performs mechanical learning or the like based on the user's speech acquired by a microphone or the like, and generates the profile information in which topics in the speech and the number of predetermined parts of speech of the words included in the speech are associated with one another. The learning apparatus 41 counts the number of predetermined parts of speech of the words that appear in the user's speech. The learning apparatus 41 generates the profile information in which the user who has made a speech, the number of predetermined parts of speech that have been counted, and the topic estimated by the topic estimation unit 3 based on the user's speech are associated with one another, and stores the profile information that has been generated in the storage unit 2.

Assume a case in which, for example, the words in the user's speech are "The weather is fine today." and the predetermined parts of speech are a noun and an adjective. In this case, the topic estimation unit 3 estimates the current topic to be "weather" based on the user's speech. The learning apparatus 41 of the information acquisition unit 4 counts, regarding the respective numbers of predetermined parts of speech of the words that appear in the user's speech, the number of nouns to be two (today, weather) and the number of adjectives to be one (fine).

Figure 2:
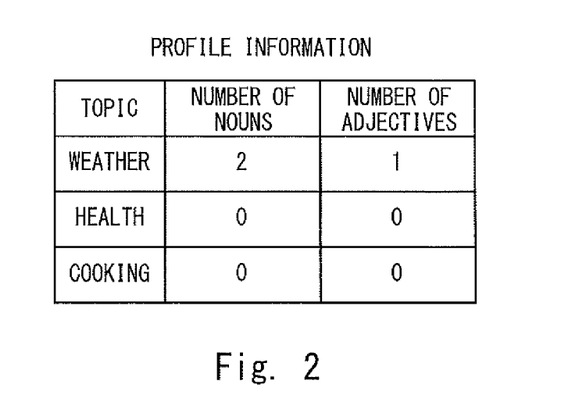
FIG. 2 is a diagram showing one example of profile information.

The learning apparatus 41 of the information acquisition unit 4 generates, as shown in FIG. 2, for example, the profile information in which the user (Mr./Ms. X), the topic (weather), and the respective numbers of predetermined parts of speech (noun and adjective) are associated with one another, and stores the profile information that has been generated in the storage unit 2. The profile information may be stored in the storage unit 2 in advance. The information acquisition unit 4 acquires the profile information stored in the storage unit 2. Further, the profile information may be input to the information acquisition unit 4 via an input apparatus or the like as appropriate.

While the topic estimation unit 3 estimates the topic based on a user's one previous speech and the learning apparatus 41 of the information acquisition unit 4 counts the respective numbers of predetermined parts of speech in the words that appear in the user's one previous speech, this configuration is merely an example. The topic estimation unit 3 may estimate the topic based on two or more of the user's previous speeches, and the learning apparatus 41 may count the respective numbers of predetermined parts of speech in the words that appear in two or more of the user's previous speeches. Accordingly, even when the user's preferences change, it is possible to learn the speech in the process in which the user's preferences change and to estimate the topic with a high accuracy using the result of learning. It is therefore possible to generate the profile information with a higher accuracy.

Further, N or more of the user's previous speeches may be sequentially deleted from the storage unit 2. It is therefore possible to estimate the topic based on a newer user's speech and to generate the profile information.

The topic presentation determination unit 5 determines whether to present a topic to the user. This determination regarding the topic presentation is appropriately performed and the interactive apparatus 1 makes a speech in accordance with this determination, whereby it is possible to avoid, for example, overlapping of speeches that may occur when the user is in the middle of talking or the user is likely to start talking. Further, it is possible to make the user feel that the interactive apparatus 1 is recognizing the user's story.

The topic presentation determination unit 5 determines that a topic should be presented to the user when, for example, both the user and the interactive apparatus 1 become silent. More specifically, the topic presentation determination unit 5 determines that the topic should be presented to the user when a silent time during which both the user and the interactive apparatus 1 do not make a speech has exceeded a predetermined waiting time after a speech unit of the interactive apparatus 1 gives a speech to the user. It is therefore possible to suppress frequent occurrences of the silent time and interruption of the dialogue.

Note that the method of determining the topic presentation is merely one example and another method may be employed. The topic presentation determination unit 5 calculates, for example, the average and the variance of the response time from the time when the speech unit gives a speech until the time when the user responds. The topic presentation determination unit 5 generates a gamma distribution regarding the response time and the speech probability using the average and the variance that have been calculated. The topic presentation determination unit 5 estimates the waiting time, which is a time during which it can be determined that the person is not willing to make a speech using the gamma distribution that has been generated. The topic presentation determination unit 5 determines, when the silent time has exceeded the estimated waiting time, that a topic should be presented to the user. It is therefore possible to determine whether to present a topic to the user more appropriately using the waiting time in accordance with the individual preference of each user.

The topic selection unit 6 is one specific example of topic selection means. The topic selection unit 6 actively selects, when it is determined by the topic presentation determination unit 5 that the topic should be presented to the user, the topic about which the user can easily talk.

The topic selection unit 6 selects one topic about which the user can easily talk from among a plurality of topics set in the profile information based on, for example, the user's speech and the profile information acquired by the information acquisition unit 4. In this way, by actively selecting the topic about which the user can easily talk from the profile information specific to the user, it is possible to provide the topic in accordance with the preference of each user and to continue the dialogue for a longer period of time.

The learning apparatus 41 of the information acquisition unit 4 carries out learning of the profile information using the plurality of user's previous speeches stored in the storage unit 2. The topic selection unit 6 selects one topic about which the user can easily talk using the profile information learned by the learning apparatus 41.

When a sufficient number of user's speeches has not been accumulated in the storage unit 2, the learning apparatus 41 of the information acquisition unit 4 cannot sufficiently carry out learning of the profile information. In this case, since the topic selection unit 6 selects the topic using this insufficient profile information, it is possible that it cannot provide an appropriate topic. Therefore, in this case, the topic selection unit 6 may select topics at random until the number of the user's speeches accumulated is a predetermined number or larger (e.g., S (about 10) or more user's speeches). Accordingly, it is possible to carry out learning of the profile information in view of the user's reaction while selecting the topics at random and providing the selected topics for the user until the number of the user's speeches accumulated is a predetermined number or larger. It is therefore possible to select and provide an appropriate topic about which the user can easily talk in accordance with the user's reaction using the profile information.

By the way, the content of the talk of users such as demented patients or elderly persons and the number of speeches made by these users may vary from day to day, which may cause extraction of important words in the speech to be biased. Therefore, when the interactive apparatus according to the related art gives a speech based on the important words that have thus been extracted, the topics of the speech may be biased, and only the topics about which the user cannot easily talk may be provided.

On the other hand, in the interactive apparatus 1 according to this embodiment, the topic selection unit 6 sets the probability of the selection of a topic in such a way that topics whose respective numbers of predetermined parts of speech are larger than those of other topics set in the profile information are selected from among the other topics with a higher probability than that of each of the other topics based on the profile information acquired by the information acquisition unit 4, and selects the topic in accordance with the probability of the selection.

When, for example, the user has made a speech regarding one topic, it is generally recognized that as the number of nouns included in the speech increases, the user has much knowledge about this topic. It is also recognized that as the number of adjectives included in the speech increases, this topic has a great influence on the user's feelings (he/she has strong feelings regarding this topic). It is also recognized that as the number of verbs included in the speech increases, the user has experienced a lot about this topic. It is also recognized that as the number of adverbs included in the speech increases, this topic has a great influence on the feelings associated with the user's experience (he/she has strong feelings regarding this topic).

Accordingly, the probability of the selection of a topic is set in such a way that the topics that the user might probably be interested in in which the respective numbers of predetermined parts of speech such as a noun, an adjective, an adverb, and a verb are larger than those of other topics in the profile information are selected from among the other topics with a higher probability than that of each of the other topics, and the topic is selected in accordance with the probability of this selection. It is therefore possible to actively select a topic about which the user can easily talk and provide the selected topic.

The topic selection unit 6 selects, based on the user's speech and the profile information acquired by the information acquisition unit 4, one topic about which the user can easily talk from among the plurality of topics set in the profile information.

The topic selection unit 6 arranges, for example, each of the topics in one of the quadrants in a t-dimensional quadrant (t is a natural number equal to or larger than two) based on the profile information acquired by the information acquisition unit 4. In each of the quadrants, the probability selected by the topic selection unit 6 is set arbitrarily or automatically. The topic selection unit 6 selects each of the quadrants in accordance with the probability set in each of the quadrants and selects the topic included in each of the quadrants. Each of the quadrants is divided by a boundary that passes a robust value (a median value, a trimmed mean etc.) from which it can be determined whether the respective numbers of predetermined parts of speech are large or small. The probability of the selection in each of the quadrants is set in such a way that the topic whose respective numbers of predetermined parts of speech are the largest among the other topics set in the profile information is selected more actively than the other topics.

In the two-dimensional quadrant, for example, the number of nouns, which is "the part of speech that remains in the user's memory or that the user frequently says", is indicated by the horizontal axis and the number of adjectives, which is "the parts of speech that express an emotional index such as emotional ups and downs", is indicated by the vertical axis. Alternatively, the number of nouns may be set in the vertical axis and the number of adjectives may be set in the horizontal axis. The boundary of the number of nouns passes, for example, the median value of the number of nouns of all the topics and the boundary of the number of adjectives passes, for example, the median value of the number of adjectives of all the topics.

Every time the user makes a speech, the profile information in the storage unit 2 is updated. The topic selection unit 6 updates the arrangement of the topics in the t-dimensional quadrant and the boundaries based on the profile information that has been updated.

Figure 3A:
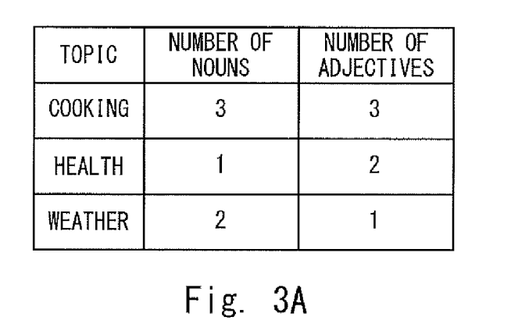
FIG. 3A is a diagram showing one example of the profile information.
Figure 3B:
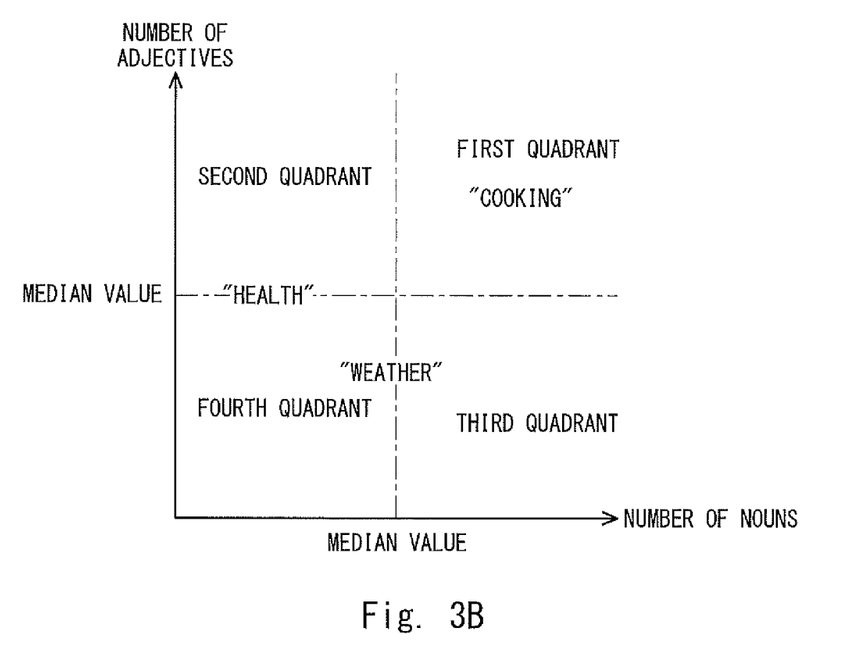
FIG. 3B is a diagram showing one example of a two-dimensional quadrant.

As shown in FIG. 3A, for example, the respective numbers of parts of speech (the number of nouns, the number of adjectives) associated with the respective topics (cooking, health, weather) set in the profile information are arranged in the two-dimensional quadrant as shown in FIG. 3B.

The topic "cooking" is arranged in (3, 3). The topic "health" is arranged in (1, 2). The topic "weather" is arranged in (2, 1). The boundary in the number of nouns passes the median value (2, 0) of the number of nouns of all the topics, and the boundary in the number of adjectives passes the median value (0, 2) of the number of adjectives of all the topics. Therefore, the topic "cooking" is arranged in the first quadrant. While the topic "health" is arranged in the boundary between the second quadrant and the fourth quadrant, it is assumed that it is arranged in the second quadrant in advance. In a similar way, while the topic "weather" is arranged in the boundary between the third quadrant and the fourth quadrant, it is assumed that it is arranged in the third quadrant in advance. As described above, when the topic is arranged in the boundary between one quadrant and another quadrant, it may be set in advance in which quadrant this topic should be arranged.

For example, the probability 50% is set in the first quadrant, the probability 30% is set in the second quadrant, and the probability 20% is set in the third quadrant. In this example, the probability that the first quadrant is selected is set to be the highest in such a way that the topic "cooking" in which (the number of adjectives+the number of nouns) are the largest is selected more actively. As described above, when the predetermined parts of speech are a combination of a noun and an adjective, it is possible to select the topics about which the user has much knowledge and interest with a higher probability from the characteristics of the parts of speech described above. It is therefore possible to actively select and provide the topic about which the user can easily talk.

The topic selection unit 6 selects each of the quadrants with the probability that has been set. The topic selection unit 6 then selects the topic included in each quadrant that has been selected. When, for example, the topic selection unit 6 has selected the first quadrant, the topic selection unit 6 selects the topic "cooking" included in the first quadrant. When the topic selection unit 6 has selected the second quadrant, the topic selection unit 6 selects the topic "health" included in the second quadrant. When the topic selection unit 6 has selected the third quadrant, the topic selection unit 6 selects the topic "weather" included in the third quadrant. That is, the topic selection unit 6 selects the topic "cooking" with the probability of 50%, selects the topic "health" with the probability of 30%, and selects the topic "weather" with the probability of 20%. As described above, by setting the highest probability in the first quadrant, the topic "cooking" in the first quadrant in which the number of nouns and the number of adjectives are the largest is actively selected. The method of selecting the topic described above is merely one example and another method may be employed.

As described above, the topics are stochastically selected in the two-dimensional quadrant of the numbers of predetermined parts of speech. Accordingly, there is a certain probability that topics other than the topics about which the user can easily talk are selected while actively selecting the topics about which the user can easily talk with a high probability, thereby preventing a situation in which the same topics are always selected.

The response generation unit 7 is one specific example of response generation means. The response generation unit 7 generates responses associated with the topic selected by the topic selection unit 6. It is therefore possible to output the optimal response associated with the user's preferences. Accordingly, it is possible to lead the user to the topic about which the user can easily talk and to continue the dialogue. Further, compared to the case in which the responses are selected and output at random, it is possible to make the user feel that the interactive apparatus 1 is responding in view of the user's preferences. Therefore, the user can feel a sense of affinity for the dialogue with the interactive apparatus 1.

For example, in the table information or the like, the topics set in the profile information and the optimal responses with respect to the respective topics may be associated with each other. The table information may be stored in the storage unit 2 or the like. The response generation unit 7 may generate the table information which is a list in which the optimal responses with respect to the topics selected by the topic selection unit 6 are automatically collected from WEB such as the Internet, and store this table information in the storage unit 2. It is therefore possible to generate the table information automatically and easily and to optimally respond using the table information.

The response generation unit 7 generates, for example, responses associated with the topic "weather" selected by the topic selection unit 6, "It has been cold recently. Haven't you caught a cold?", "What kind of weather do you like?" etc. The response generation unit 7 generates responses associated with the topic "cooking" selected by the topic selection unit 6, "What did you eat for breakfast?", "What is your favorite food?" etc. The response generation unit 7 generates responses associated with the topic "health" selected by the topic selection unit 6, "What is the key to your health?", "You caught a cold, didn't you?" etc.

The response generation unit 7 may select the response that corresponds to the topic at random from the table information or may select a response that matches the context of the speech in combination with another technique. The response generation unit 7 may output the response that has once been selected and output after a predetermined period of time has passed. It is therefore possible to respond to the user more naturally without repeating the same response in a short period of time.

The response generation unit 7 outputs the response that has been generated using a speaker or the like.

Figure 4:
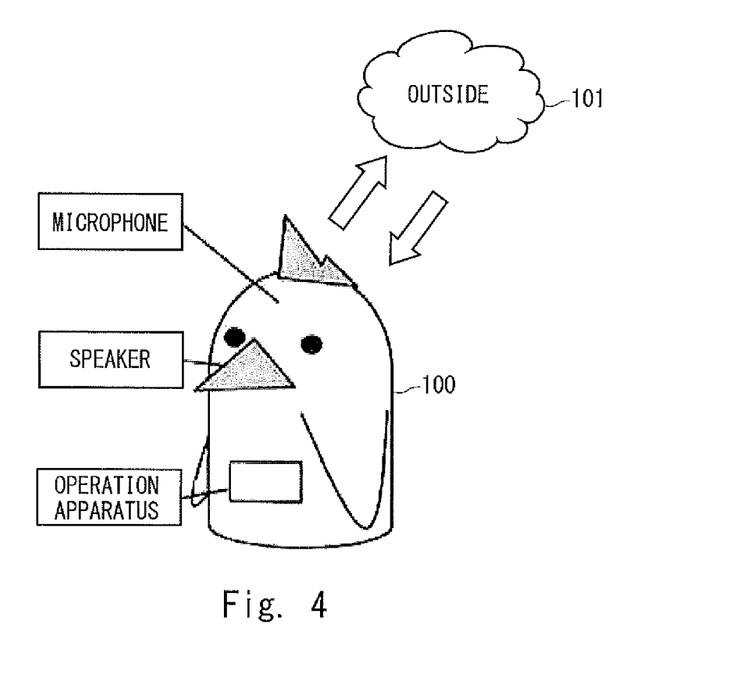
FIG. 4 is a schematic diagram showing a schematic configuration of an interactive robot.

The interactive apparatus 1 according to this embodiment is mounted on, for example, the interactive robot 100 or the like. The interactive robot 100 is provided with, as shown in FIG. 4, a microphone, a speaker, an operation apparatus and the like. Some or all of the storage unit 2, the topic estimation unit 3, the information acquisition unit 4, the topic presentation determination unit 5, and the response generation unit 7 of the interactive apparatus 1 may be provided in an outside (e.g., an external server) 101 of the interactive robot 100. In this case, the interactive robot 100 and the outside 101 may be connected to each other via a communication network such as Long Term Evolution (LTE) and may perform data communication with each other.

Figure 5:
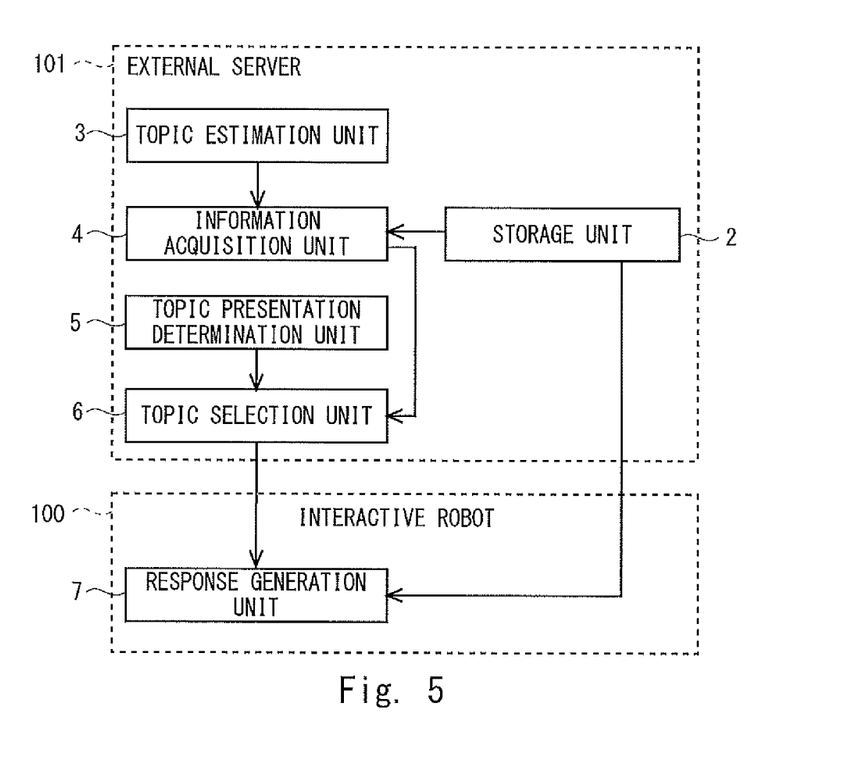
FIG. 5 is a diagram showing a schematic configuration of an external server and an interactive robot.

As shown in FIG. 5, for example, the storage unit 2, the topic estimation unit 3, the information acquisition unit 4, and the topic presentation determination unit 5 may be provided in the external server 101 and the response generation unit 7 may be provided in the interactive robot 100.

As described above, the external server 101 and the interactive robot 100 perform processing different from each other, whereby it is possible to reduce the processing in the interactive robot 100 and to reduce the size and the weight of the interactive robot 100. Further, by enhancing the processing capability of the external server 101, it becomes possible to easily improve the processing capability of the interactive apparatus 1 and to make more complicated responses. Further, if main components are provided in the interactive robot 100 when maintenance inspections of the interactive apparatus 1 are carried out, the user needs to go to the place where the interactive robot 100 is located. However, by providing the main components in the external server 101, the user does not need to go to this place, which reduces the human workload required for maintenance inspections and the like.

By providing the storage unit 2 that stores the profile information in the external server 101, the storage unit 2 can store a large amount of data. On the other hand, by providing the response generation unit 7 in the interactive robot 100, it becomes possible to increase the immediacy of the dialogue and to improve the response speed of the speech given to the user. It is possible to achieve the responsiveness that does not depend on the rate of communication with the external server 101.

For example, it is possible to maintain interactive performance even in an environment in which the radio wave condition is poor. In view of the aforementioned advantages and the environment in which the interactive apparatus 1 is used, the storage unit 2, the topic estimation unit 3, the information acquisition unit 4, the topic presentation determination unit 5, and the response generation unit 7 of the interactive apparatus 1 are preferably arranged in the external server 101 and the interactive robot 100.

While the interactive apparatus 1 is configured in such a way that it is mounted on the interactive robot 100, this is merely an example. The interactive apparatus 1 may be mounted on a desired apparatus including an input/output apparatus such as a monitor, a keyboard and the like or a mobile terminal such as a smartphone.

Figure 6:
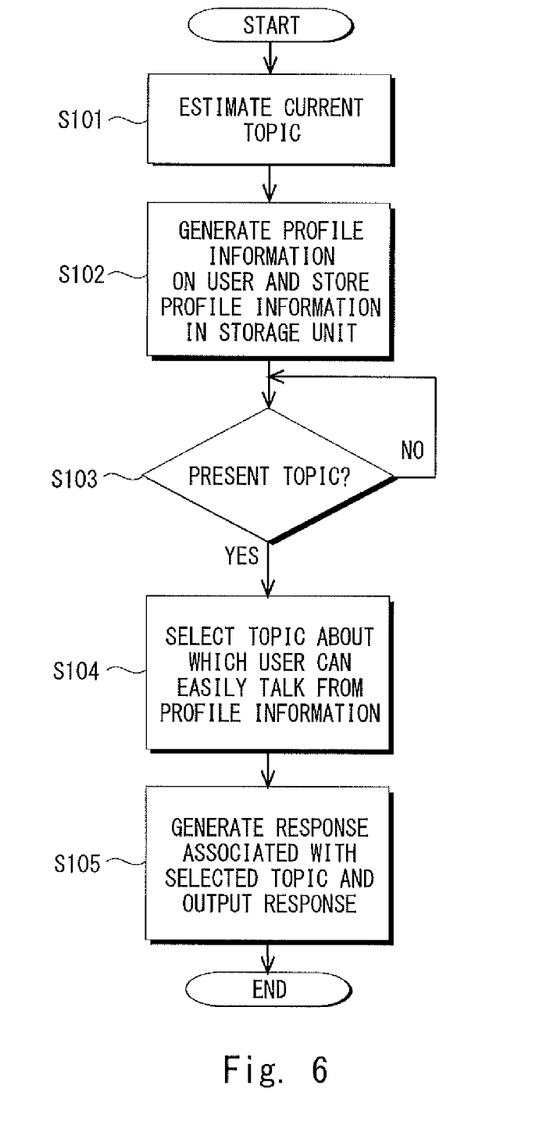
FIG. 6 is a flowchart showing one example of a process flow of an interactive method according to one embodiment of the present invention.

FIG. 6 is a flowchart showing one example of the process flow of the interactive method according to this embodiment. Note that the process flow shown in FIG. 6 may be, for example, repeatedly executed at every predetermined time interval.

The topic estimation unit 3 estimates, based on the user's speech history and the like stored in the storage unit 2 or the like, the current topic using the word embedding method (Step S101).

The learning apparatus 41 of the information acquisition unit 4 counts the respective numbers of predetermined parts of speech of the words that appear in the user's speech. The learning apparatus 41 generates the profile information in which the user who has made a speech, the respective numbers of predetermined parts of speech that have been counted, and the topic estimated by the topic estimation unit 3 based on the user's speech are associated with one another, and stores the profile information that has been generated to the storage unit 2 (Step S102).

The topic presentation determination unit 5 determines, based on the silent time etc., whether to present a topic to the user (Step S103).

When the topic presentation determination unit 5 has determined that the topic should be presented to the user, (YES in Step S103), the topic selection unit 6 selects, based on the user's speech and the profile information acquired by the information acquisition unit 4, one topic about which the user can easily talk from among the plurality of topics set in the profile information in accordance with the probability of the selection that has been set (Step S104).

The response generation unit 7 generates a response associated with the topic selected by the topic selection unit 6 and outputs the response that has been generated using a speaker or the like (Step S105).

As described above, in the interactive apparatus 1 according to this embodiment, the topic selection unit 6 sets the probability of the selection of the topic in such a way that topics whose numbers of predetermined parts of speech are larger are selected with a higher probability from among the topics set in the profile information based on the profile information acquired by the information acquisition unit 4, and selects the topic in accordance with the probability of the selection.

Accordingly, the probability of the selection of the topic is set in such a way that the topics that the user is interested in in which the numbers of predetermined parts of speech such as a noun, an adjective, an adverb, and a verb are larger are selected with a higher probability, and the topic is selected in accordance with the probability of this selection. It is therefore possible to actively select the topic about which the user can easily talk and provide the selected topic.

Note that the present invention is not limited to the aforementioned embodiment and may be changed as appropriate without departing from the spirit of the present invention.

While the predetermined parts of speech are a combination of a noun and an adjective in the aforementioned embodiment, this is merely an example. When the predetermined parts of speech are a combination of a noun and an adjective, from the characteristics of the parts of speech described above, it is possible to actively select and provide a topic about which the user has much knowledge and in which the user is interested.

The predetermined parts of speech may be a combination of a noun and a verb. When the predetermined parts of speech are a combination of a noun and a verb, it is possible to actively select and provide a topic about which the user has much knowledge and a lot of memories through experience from the characteristics of the parts of speech described above.

The predetermined parts of speech may be a combination of a verb and an adverb. When the predetermined parts of speech are a combination of a verb and an adverb, it is possible to actively select and provide a topic about which the user can easily talk since the user has a lot of memories through experience and thus has a lot of feelings associated therewith (which means that the user has a lot of things to talk about this topic) from the characteristics of the parts of speech described above.

By changing the combination of the predetermined parts of speech as described above, it becomes possible to actively select and provide the topic that matches the user's preferences.

Further, the predetermined parts of speech are not limited to a combination of two parts of speech and may be a combination of three or more parts of speech. The predetermined parts of speech may be, for example, a combination of a noun, a verb, and an adverb. In this case, the topic selection unit 6 arranges each topic in one of the quadrants in the three-dimensional quadrant based on, for example, the profile information stored in the storage unit 2.

Further, the predetermined part of speech such as a noun, an adjective, an adverb, and a verb may be combined with a part of speech indicating the user's lack of interest (hereinafter this part of speech will be referred to as a passive part of speech). The passive part of speech indicating the user's lack of interest includes, for example, a pronoun.

When, for example, a noun, a pronoun, and an adjective are combined with one another, the topic selection unit 6 sets the probability of the selection of the topic in such a way that topics whose numbers of parts of speech (the number of nouns−the number of pronouns+the number of adjectives) are larger are selected with a higher probability from among topics set in the profile information based on the profile information acquired by the information acquisition unit 4, and selects the topic in accordance with the probability of this selection.

As described above, the respective numbers of parts of speech obtained by subtracting the number of pronouns indicating the user's lack of interest from the predetermined parts of speech indicating the user's interest (the number of nouns and the number of adjectives) are obtained. The respective numbers of parts of speech thus obtained indicate the user's final interest with respect to the topic. Accordingly, it is possible to select and provide the topic about which the user can easily talk with a high accuracy in consideration of not only the predetermined parts of speech indicating the user's interest but also the number of pronouns indicating the user's lack of interest.

The present invention can achieve the processing shown in FIG. 6 by causing, for example, a CPU to execute a computer program.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An interactive speech apparatus comprising:
   a microphone;
   a speaker;
   a memory that stores a user's speech history; and
   a processor configured to:
      acquire, via the microphone, speech data;
      convert words included in the acquired speech data into semantic representation vectors and learn a hierarchical relation between the words and topics;
      estimate a current topic based on set probabilities of the topics; and
      control the speaker to output, to the user, audio data corresponding to the estimated current topic, wherein the processor is further configured to set the probabilities of the topics by:
         generating profile information that associates a topic included in the user's previously recorded speech data with a number count of a predetermined part of speech included in the user's previously recorded speech data for each of at least one predetermined part of speech, the at least one predetermined part of speech including one or more of a noun type, an adjective type, an adverb type, or a verb type; and based on the number count of the predetermined part of speech associated with the topic or number counts of predetermined parts of speech associated with the topic being larger than a number count or number counts of other topics, setting a probability of the topic being selected to be the estimated current topic to be a higher probability than a probability of each of the other topics being selected to be the estimated current topic.

2. The interactive speech apparatus according to claim 1, wherein the at least one predetermined part of speech include at least two of: the noun type, the adjective type, the adverb type, or the verb type.

3. The interactive speech apparatus according to claim 1, wherein the at least one predetermined part of speech include a combination of two or more predetermined parts of speech.

4. The interactive speech apparatus according to claim 3, wherein the at least one predetermined part of speech include the noun type and the adjective type.

5. The interactive speech apparatus according to claim 1, wherein the processor is further configured to: set the probability that the topic is to be selected as the estimated current topic in such a way that a topic whose number of nouns and number of adjectives are the largest among topics set in the profile information is selected with a higher degree of probability than that of each of the other topics.

6. The interactive speech apparatus according to claim 1, wherein the processor is further configured to:
calculate the number counts of the parts of speech by subtracting a number of pronouns included in the user's previously recorded speech data from a total number of predetermined parts of speech.

7. The interactive speech apparatus according to claim 1, wherein the memory further stores the generated profile information, wherein the processor selects a random topic at random until a number of instances of the user's previously recorded speech data accumulated reaches a predetermined number or more in the stored profile information.

8. An interactive speech method comprising:
acquiring, via a microphone, speech data;
converting words included in the acquired speech data into semantic representation vectors and learn a hierarchical relation between the words and topics;
estimating a current topic based on set probabilities of the topics; and
controlling a speaker to output, to the user, audio data corresponding to the estimated current topic, wherein the interactive speech method further includes setting of the probabilities of the topics by:
generating profile information that associates a topic included in the user's previously recorded speech data with a number count of a predetermined part of speech included in the user's previously recorded speech data for each of at least one predetermined part of speech, the at least one predetermined part of speech including one or more of a noun type, an adjective type, an adverb type, or a verb type; and
based on the number count of the predetermined part of speech associated with the topic or number counts of predetermined parts of speech associated with the topic being larger than a number count or number counts of other topics, setting a probability of the topic being selected to be the estimated current topic to be a higher probability than a probability of each of the other topics being selected to be the estimated current topic.

9. A non-transitory computer readable medium that stores interactive speech program code, which, when executed by a computer, causes the computer to:
acquire, via a microphone, speech data;
convert words included in the acquired speech data into semantic representation vectors and learn a hierarchical relation between the words and topics;
estimate a current topic based on set probabilities of the topics; and
control a speaker to output, to the user, audio data corresponding to the estimated current topic, wherein the computer is further configured to execute the interactive speech program code to set the probabilities of the topics by:
generating profile information that associates a topic included in the user's previously recorded speech data with a number count of a predetermined part of speech included in the user's previously recorded speech data for each of at least one predetermined part of speech, the at least one predetermined part of speech including one or more of a noun type, an adjective type, an adverb type, or a verb type; and
based on the number count of the predetermined part of speech associated with the topic or number counts of predetermined parts of speech associated with the topic being larger than a number count or number counts of other topics, setting a probability of the topic being selected to be the estimated current topic to be a higher probability than a probability of each of the other topics being selected to be the estimated current topic.

* * * * *